(12) United States Patent
Kim

(10) Patent No.: US 7,646,185 B2
(45) Date of Patent: Jan. 12, 2010

(54) AUTOMATIC EXTERNAL SWITCH DETECTION IN SYNCHRONOUS SWITCHING REGULATOR CONTROLLER

(75) Inventor: Sang Hoon Kim, Grayslake, IL (US)

(73) Assignee: Micrel, Inc., San Jose, CA (US)

( * ) Notice: Subject to any disclaimer, the term of this patent is extended or adjusted under 35 U.S.C. 154(b) by 487 days.

(21) Appl. No.: 11/467,433

(22) Filed: Aug. 25, 2006

(65) Prior Publication Data
US 2008/0048631 A1    Feb. 28, 2008

(51) Int. Cl.
*G05F 1/00* (2006.01)
(52) U.S. Cl. ..................... 323/283; 323/222
(58) Field of Classification Search ......... 323/283–288, 323/222, 282
See application file for complete search history.

(56) References Cited

U.S. PATENT DOCUMENTS 5,757,173 A * 5/1998 Agiman ................. 323/282

7,019,507 B1 * 3/2006 Dittmer et al. ............. 323/284

OTHER PUBLICATIONS

Linear Technology, Datasheet LT1158, 1994,Rev. B, pp. 1-22.*
Linear Technology, Datasheet LT1525A, pp. 5-97 to 5-104.*

* cited by examiner

*Primary Examiner*—Bao Q. Vu
*Assistant Examiner*—Jue Zhang
(74) *Attorney, Agent, or Firm*—Patent Law Group LLP; Carmen C. Cook

(57) ABSTRACT

A synchronous switching regulator controller incorporates a switch detection circuit to determine the presence or absence of a power switch at the output of a switch driver so that the switch driver can be disabled when it is left unused. In one embodiment, the synchronous controller includes a switch detection circuit receiving a power cycle signal and the PWM ramp clock signal and measuring a voltage at an output node of the switch driver. The switch detection circuit provides a driver enable signal in response to the assertion of the power cycle signal. The driver enable signal has a first logical state when the voltage at the output node of the switch driver is greater than a reference voltage and a second logical state when the voltage at the output node is less than a reference voltage. The switch driver can be disabled based on the driver enable signal.

10 Claims, 3 Drawing Sheets

AUTOMATIC EXTERNAL SWITCH DETECTION IN SYNCHRONOUS SWITCHING REGULATOR CONTROLLER

FIELD OF THE INVENTION

The invention relates to synchronous switching regulator controllers and, in particular, to a synchronous switching regulator controller with automatic external power switch detection.

DESCRIPTION OF THE RELATED ART

DC voltage regulators or switching regulators operate to convert energy from one DC voltage level to another DC voltage level. This type of switching regulators is also referred to as DC/DC converters. A switching regulator, sometimes referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the switching regulator is well known and is generalized as follows. A power switch is turned on to apply energy to an inductor of the output filter circuit to allow the current through the inductor to build up. When the power switch is turned off, the voltage across the inductor reverses and charges are transferred onto an output capacitor of the output filter circuit and the load. A relatively constant output voltage is maintained by the output capacitor.

A switching regulator can be constructed using integrated (internal) power switches or external power switches. When the power switches are external to the switching regulator integrated circuit (IC), the switching regulator IC is sometimes referred to as a switching regulator controller or converter controller to indicate that the switching regulator controller provide the control signals for driving the external power switches which are in turn coupled to the output filter circuit to generate the relatively constant output voltage.

A common technique used in the feedback control of switching regulators is pulse-width modulation (PWM). A PWM switching regulator provides regulation by controlling the duty cycle (or by varying the pulse width) of the rectangular switching voltage $V_{SW}$ that is applied to the inductor and the capacitor of the output filter circuit. A PWM switching regulator, regardless of the topology, uses power switches to drive the switching voltage $V_{SW}$ node. In particular, almost all PWM control topologies use at least one active switch, such as a field effect transistor (FET), and one passive switch, such as a diode, driving the switching voltage $V_{SW}$ node. In applications where high efficiency is desired, a PWM switching regulator uses an active switch in place of the passive switch (the diode) to reduce losses. A PWM switching regulator controller coupled to drive two power switches is referred to as a "synchronous switching regulator controller" or "synchronous controller".

A synchronous controller integrated circuit includes two output drivers—a high-side driver and a low-side driver—to control the two external power switches for switching the switching voltage $V_{SW}$ node. The high-side driver controls the high-side switch which is the essential main switch and the low-side driver controls the low-side switch which is used for the synchronous operation. However, in some applications, a user may decide to use a passive switch with a synchronous controller integrated circuit, such as for cost reduction reasons. In that case, the low-side driver driving what would have been the synchronous switch is left open. However, the control circuit on the controller still switches the low-side driver and the output node of the driver is still being driven, even though the node is left floating. At low frequency PWM operation, the switching of the open node may not create a problem. However, as synchronous controllers are being operated at higher and higher frequencies, the switching of the open node may cause undesired problems.

Specifically, the frequency of the synchronous controllers is now reaching into the AM band and well beyond the mega-Hertz range. When an open node is driven in high frequency, the open node becomes an RF transmission line, causing unwanted electromagnetic interference (EMI) noise. Furthermore, in some cases, there is no guarantee that the output node of the low-side driver is really open DC wise and there may be coupling of the open node to other circuitry on the integrated circuit or on the PC board. Thus, the switching of the open node may introduce noise to other parts of the synchronous controller or other components on the same PC board.

In the past, an additional package pin is used to indicate the configuration of the synchronous controller. That is, the user uses the additional package pin to indicate the presence or absence of the low-side power switch. But this solution requires an additional pin which may not be feasible for small packages.

SUMMARY OF THE INVENTION

According to one embodiment of the present invention, a synchronous switching regulator controller includes a first switch driver coupled to a first terminal to provide a first driving signal, a second switch driver coupled to a second terminal to provide a second driving signal, a PWM ramp clock generator providing a PWM ramp clock signal to a PWM comparator and a control logic circuit generating control signals for the first and second switch drivers based at least in part on the output signal of the PWM comparator. The synchronous switching regulator controller includes a switch detection circuit receiving a power cycle signal indicating that the synchronous switching regulator controller is to be turned on and the PWM ramp clock signal. The switch detection circuit measures a voltage at an output node of the second switch driver. The switch detection circuit provides a driver enable signal to the control logic circuit in response to the assertion of the power cycle signal where the driver enable signal has a first logical state when the voltage at the output node of the second switch driver is greater than a reference level and a second logical state when the voltage at the output node of the second switch driver is less than a reference level. The control logic circuit disables the second switch driver when the drive enable signal has the first logical state and enables the second switch driver when the drive enable signal has the second logical state.

The present invention is better understood upon consideration of the detailed description below and the accompanying drawings.

DETAILED DESCRIPTION OF THE PREFERRED EMBODIMENTS

In accordance with the principles of the present invention, a synchronous switching regulator controller ("synchronous controller") incorporates an automatic switch detection circuit to determine the presence or absence of a power switch at the output of the low-side switch driver so that the switch driver can be disabled when the low-side switch driver is not used to drive an active power switch. The automatic switch detection circuit of the present invention operates to prevent the synchronous switching regulator controller from switching an unused driver output node. In this manner, unwanted EMI noise emission from the controller is avoided.

In operation, the input impedance of the power switch is used to indicate the presence of a power switch coupled to the low-side switch driver. The voltage value at the output node of the switch driver in response to a PWM pulse indicates either an open node or a node with a certain amount of input impedance. When the voltage of the output node of the switch driver indicates an open output node, the automatic switch detection circuit will instruct the control logic of the synchronous controller to disable the switch driver to prevent unwanted switching of the open output node.

The automatic switch detection circuit of the present invention can be incorporated in any synchronous controllers, including as buck, boost or buck-boost controllers. Furthermore, the automatic switch detection circuit of the present invention can also be incorporated in a synchronous rectifier controller.

Figure 1:
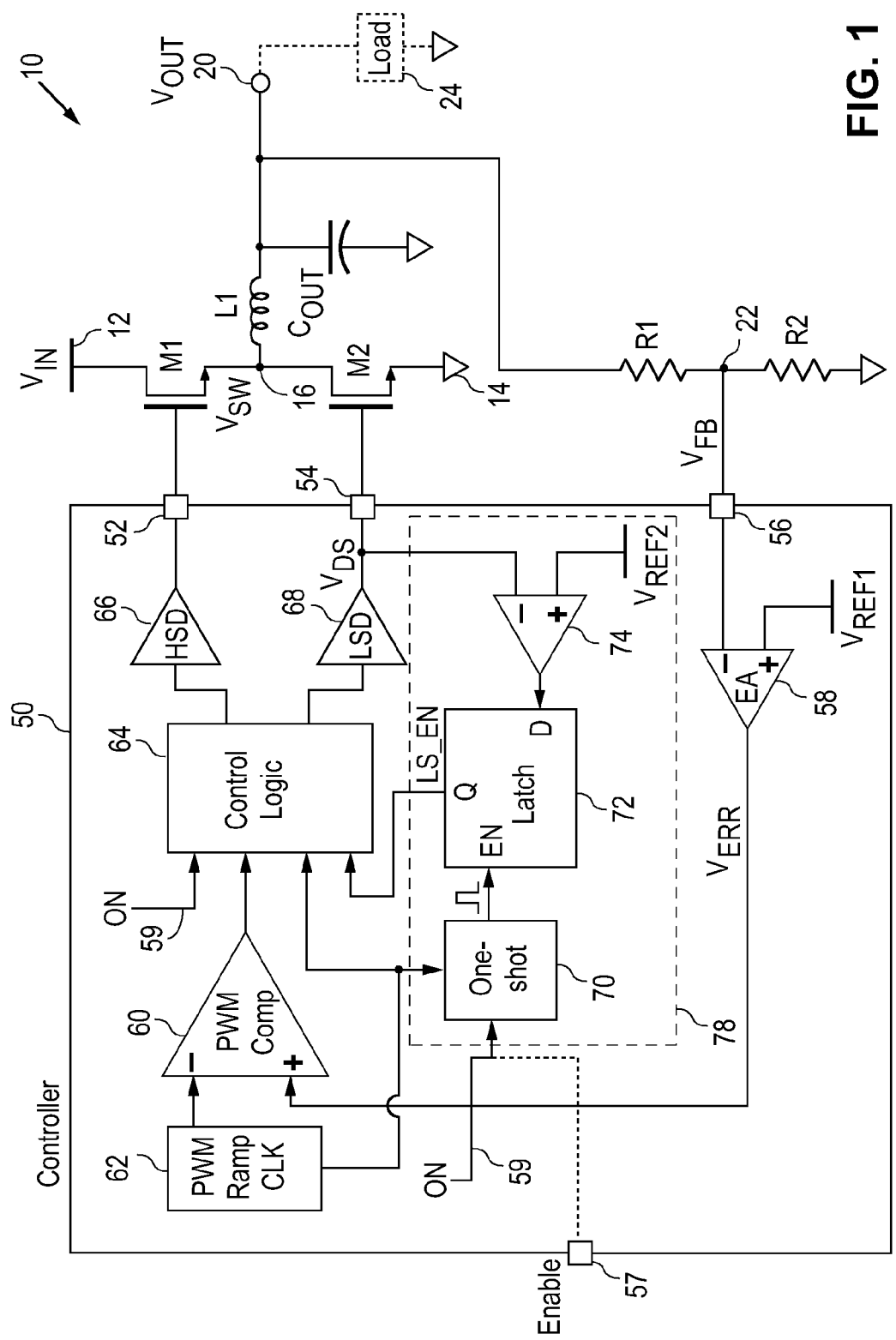
FIG. 1 is a schematic diagram of a PWM switching regulator including a synchronous controller incorporating an automatic switch detection circuit according to one embodiment of the present invention.

FIG. 1 is a schematic diagram of a PWM switching regulator including a synchronous controller incorporating an automatic switch detection circuit according to one embodiment of the present invention. Referring to FIG. 1, a PWM switching regulator 10 includes a synchronous switching regulator controller 50 ("synchronous controller") coupled to drive a pair of power switches M1 and M2 which in turns drive an output filter circuit formed by an inductor L1 and a capacitor $C_{OUT}$. The high-side switch M1 is the main switch of the PWM switching regulator and the low-side switch M2 is used for the synchronous operation. In some applications, it may be desirable to replace the low-side power switch M2 with a passive element, such as a diode. Synchronous controller 50 incorporates an automatic switch detection circuit 78 for determining the presence or absence of a power switch coupled to the low-side driver of the synchronous controller so that the low-side driver can be turned off when not being used to drive an active power switch.

FIG. 1 illustrates an exemplary configuration of a PWM switching regulator 10 in which the automatic switch detection circuit of the present invention is incorporated. The switching regulator topology shown in FIG. 1 is illustrative only and the automatic switch detection circuit of the present invention can be incorporated in any PWM switching regulator topology to provide switch detection and driver disable functions. The conventional components of PWM switching regulator 10 and the basic switch mode regulation operation will first be described, followed by the description of the automatic switch detection circuit of the present invention.

PWM switching regulator 10 receives an input voltage $V_{IN}$ on a node 12. A pair of power switches M1 and M2 are connected in series between the input voltage $V_{IN}$ (node 12) and the ground voltage (node 14). In the present embodiment, power switches M1 and M2 are NMOS transistors and are controlled by drive signals generated by synchronous controller 50. A switching output voltage $V_{SW}$ is generated at the common node 16 between power switches M1 and M2. The switching output voltage $V_{SW}$ is coupled to an inductor-capacitor (LC) network including inductor L1 and capacitor $C_{OUT}$ for filtering the switching output voltage $V_{SW}$ and generating a DC output voltage $V_{OUT}$ at a DC output voltage node 20 having a substantially constant magnitude. In actual implementation, the DC output voltage $V_{OUT}$ is used to drive a load 24. It is understood that, in a PWM switching regulator, the duty cycle of the switching output voltage $V_{SW}$ multiplied by the input voltage $V_{IN}$ determines the magnitude of the DC output voltage $V_{OUT}$, and hence, the full power voltage provided by the PWM switching regulator.

The DC output voltage $V_{OUT}$ is coupled back to synchronous controller 50 to form a feedback control loop for regulating the switching output voltage $V_{SW}$. Specifically, output voltage $V_{OUT}$ is coupled to a voltage divider formed by resistors R1 and R2 and a feedback voltage $V_{FB}$ (node 22), being a stepped down version of the output voltage $V_{OUT}$, is fed back to synchronous controller 50 on a terminal 56. Feedback voltage $V_{FB}$ is coupled to a first input terminal (the negative input terminal) of an error amplifier 58. A reference voltage $V_{REF1}$ is coupled to a second input terminal (the positive input terminal) of error amplifier 58. Error amplifier 58 evaluates the difference between the feedback voltage $V_{FB}$ and the reference voltage $V_{REF1}$ and provides an error voltage signal $V_{ERR}$ indicative of the difference between the feedback voltage $V_{FB}$ and the reference voltage $V_{REF1}$. The error voltage signal $V_{ERR}$ is coupled to a first input terminal (the positive input terminal) of a PWM comparator 60. PWM comparator 60 also receives a PWM ramp clock signal from a PWM ramp clock generator 62 on a second input terminal (the negative input terminal).

In operation, the error voltage signal $V_{ERR}$ determines the duty cycle of the switching output voltage $V_{SW}$. Based on the control of the error voltage signal $V_{ERR}$, synchronous controller 50 drives switching transistors M1 and M2 to establish the desired duty cycle for switching output voltage $V_{SW}$ and ultimately the desired DC output voltage $V_{OUT}$.

More specifically, PWM comparator 60 compares the PWM ramp clock signal and the error voltage signal $V_{ERR}$ and provides an output signal to a control logic circuit 64. Control logic circuit 64 also receives the PWM ramp clock signal from the PWM ramp clock generator 62. Control logic circuit 64 generates control signals for driving a pair of switch drivers: a high-side driver 66 and a low-side driver 68. In response to the control signals from control logic circuit 64, high-side driver 66 generates a driving signal to drive the high-side switching transistor M1 through a terminal 52 and low-side driver 68 generates a driving signal to drive the low-side switching transistor M2 through a terminal 54. Control logic circuit 64 generates control signals to turn transistors M1 and M2 on and off alternately to generate the switching output voltage $V_{SW}$.

In the present embodiment, PWM switching regulator 50 uses an external voltage divider of resistors R1 and R2 to generate the stepped-down feedback voltage $V_{FB}$. In other embodiments, the voltage divider may be integrated into synchronous controller 50 so that the output voltage $V_{OUT}$ is coupled directly to the internal voltage divider of the synchronous controller 50 to be stepped down. The exact configuration and arrangement of the voltage divider for generating the feedback voltage $V_{FB}$ is not critical to the practice of the present invention.

In PWM switching regulator 10, transistor M1 functions as the main switch while transistor M2 functions as the synchronous switch. In some application, transistor M2 may be omitted and a passive device, such as a diode, is used in place of transistor M2. In that case, low-side driver 68 is not used and the output node (terminal 54) of low-side driver 68 is left open. When low-side driver 68 is not used to drive an active switch, low-side driver 68 needs to be turned off so that the driver does not continuously switch the open output node.

In accordance with the present invention, synchronous controller 50 includes an automatic switch detection circuit 78 coupled to detect the presence or absence of an active power switch coupled to the output node (terminal 54) of low-side driver 68. In the present embodiment, automatic switch detection circuit 78 includes an one-shot circuit 70, a latch circuit 72 and a comparator 74. Automatic switch detection circuit 78 is activated each power cycle of PWM switching regulator 10. A power cycle refers to the condition where PWM switching regulator 10 is being powered up or is being enabled. In some switching regulator topologies, an Enable pin (terminal 57) is used to indicate when the PWM switching regulator is to be turned on. The synchronous controller turns on when the Enable pin is asserted. In other switching regulator topologies, the input voltage $V_{IN}$ is measured and when the input voltage $V_{IN}$ increases above a certain threshold, an ON signal (node 59) is triggered to indicate that the switching regulator and the synchronous controller are to be turned on. For instance, the ON signal is provided to the control logic circuit 64 to instruct the control logic circuit to turn on.

In accordance with the present invention, automatic switch detection circuit 78 can receive either the Enable signal (terminal 57) or the ON signal (node 59) as a power cycle signal to indicate that a power cycle has occurred and that the synchronous controller 50 is to be turned on. In FIG. 1, an ON signal is shown coupled to one-shot circuit 70 and the Enable signal is also shown coupled to one-shot circuit 70 via a dotted line. It is understood that only one of the ON signal and Enable signal is necessary for one-shot circuit 70 and both signals are included in FIG. 1 to illustrate alternate embodiments.

One-shot circuit 70 receives the power cycle signal (either the ON signal or the Enable signal) and the PWM ramp clock signal from PWM ramp clock generator 62. In response to a power cycle of the synchronous controller 50, the one-shot circuit 70 generates an one-shot pulse synchronized to the first PWM pulse generated for the low-side switch driver. The one-shot pulse is provided to latch 72 as the enable input signal. In response to the one-shot pulse at the enable input, latch 72 latches the data value at the data input terminal D at the falling edge of the one-shot pulse and provide the latched data value on the output terminal Q.

Figure 3:
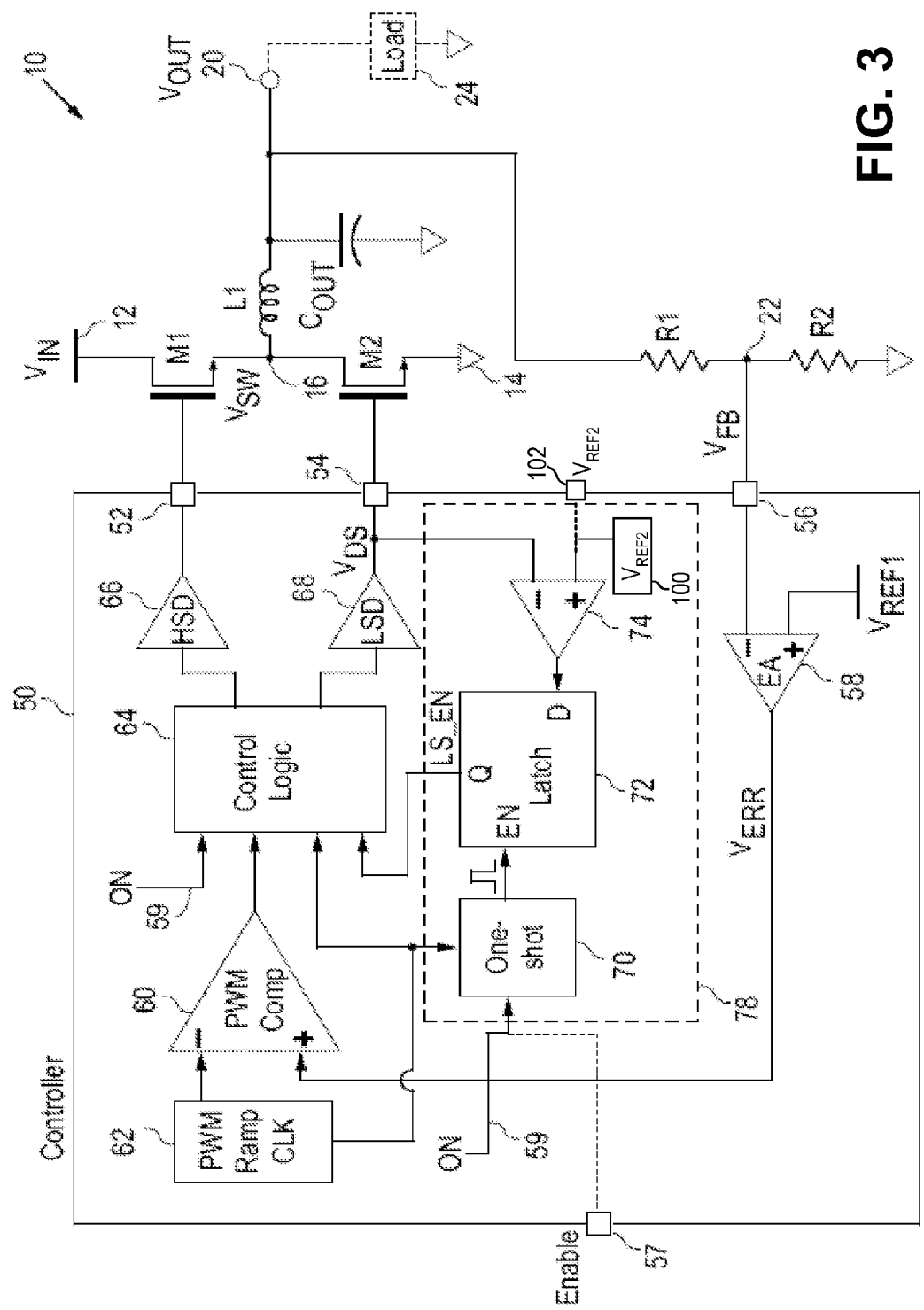
FIG. 3 is a schematic diagram of a PWM switching regulator including a synchronous controller incorporating an automatic switch detection circuit according to an alternate embodiment of the present invention.

Comparator 74 is coupled to measure a voltage $V_{DS}$ at the output node of the low-side switch driver 68 in response to the first PWM pulse provided by control logic circuit 64. Comparator 74 compares the voltage $V_{DS}$ to a reference voltage $V_{REF2}$. The output voltage of comparator 74 is coupled to the data input terminal D of latch 72 as the data input signal. Reference voltage $V_{REF2}$ can be generated internally in synchronous controller 50, such as using a reference voltage generator 100 as shown in FIG. 3, or the reference voltage can be an external voltage provided to controller 50 through a terminal on the controller integrated circuit, such as through the dotted line to terminal 102 as shown in FIG. 3.

The one-shot pulse generated by one-shot circuit 70 has a given duration which can be the same as the switching frequency of the PWM ramp clock or a different frequency. The duration of the one-shot pulse determines when the voltage $V_{DS}$ is to be measured after the first PWM pulse is applied to the low-side switch driver 68. The exact duration of the one-shot pulse is not critical but should be long enough so that the voltage $V_{DS}$ is measured at a given time interval after the rising edge of the first PWM pulse to allow for different input impedances at the output node of the low-side switch driver to be measured.

If a power switch is connected to the output node (terminal 54) of low-side driver 68, the input impedance of the power switch will cause the voltage $V_{DS}$ at the output node to rise up slowly in response to the application of a PWM pulse at the input of the low-side driver. For example, the power switch is usually a MOS transistor, such as transistor M2. An MOS transistor has associated with it parasitic capacitance between the gate to drain and gate to source. The low-side driver 68 has to charge up these capacitances when driving transistor M2. As a result, the rise time of the gate voltage of transistor M2 is slowed down in response to the rising edge of the PWM pulse. On the other hand, if no power switch is coupled to the output node (terminal 54) of low-side driver 68, then the low-side driver 68 is not driving any impedance and the voltage $V_{DS}$ at the output node 54 will increase rapidly in response to a PWM pulse at the input of the driver. Thus, the rise time of the output voltage $V_{DS}$ at the output node (terminal 54) or the slope $\partial V/\partial t$ of the voltage $V_{DS}$ can be used to determine the presence or absence of a power switch at terminal 54.

Figure 2:
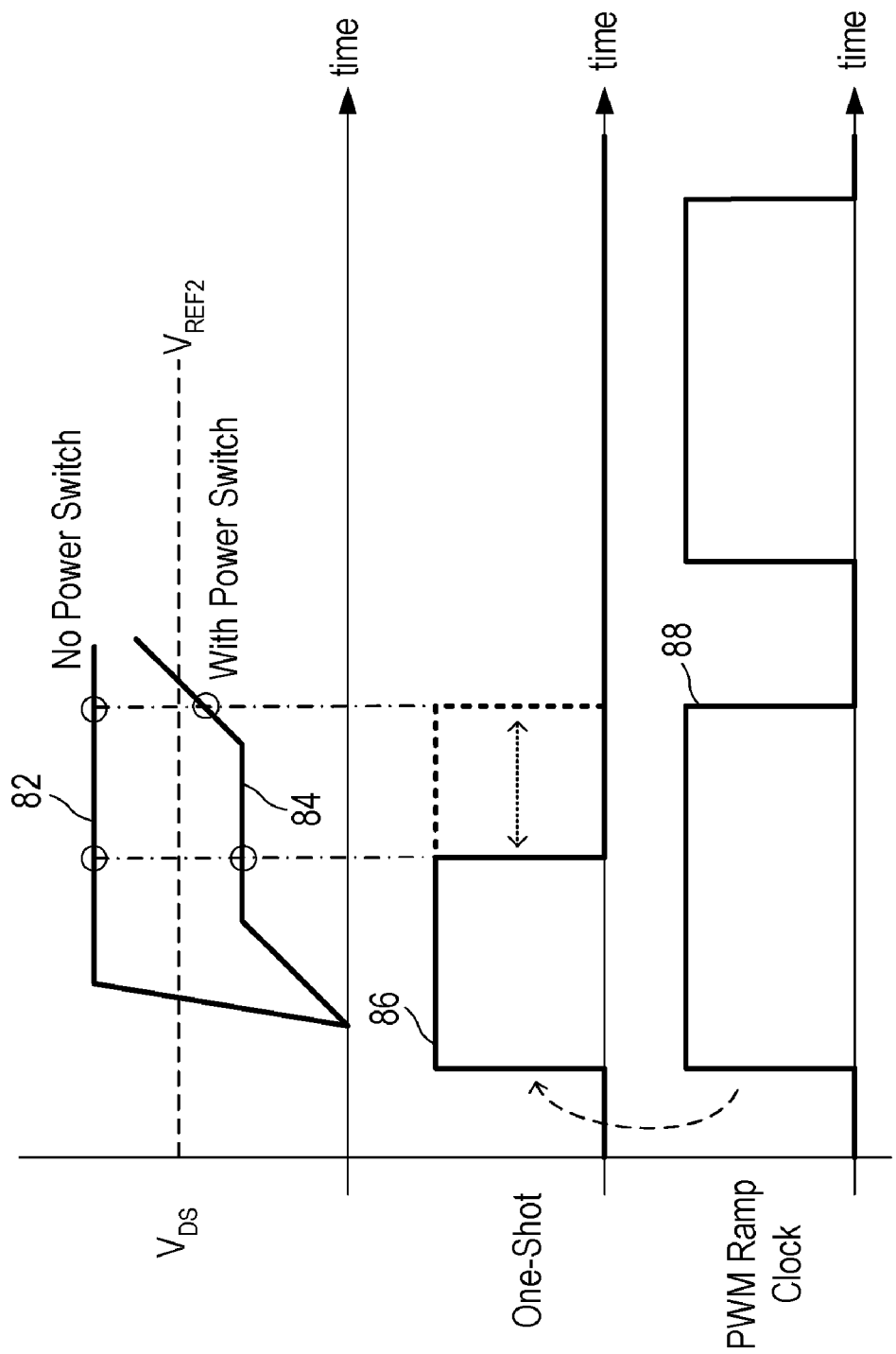
FIG. 2 illustrates voltage waveforms in the synchronous switching regulator controller of FIG. 1.

FIG. 2 illustrates voltage waveforms in the synchronous switching regulator controller of FIG. 1. Referring to FIG. 2, it is assumed that the first pulse in PWM ramp clock signal 88 is the first PWM pulse for the low-side driver 68 after a power cycle of PWM switching regulator 10. In response to the power cycle, one-shot circuit 70 generates an one-shot pulse 86 having a rising edge synchronized to the rising edge of the first PWM pulse of the PWM ramp clock signal 88. The one-shot pulse 86 has a given duration and the exact duration is not critical to the practice of the present invention. As described above, the duration of the one-shot pulse determines when the voltage $V_{DS}$ is to be measured. In FIG. 2, a range of duration of one-shot pulse 86 is shown to illustrate the possibilities of using different duration for one-shot pulse 86.

The voltage $V_{DS}$ in response to the first pulse of the PWM ramp clock signal 88 for the case with and without a power switch connected to terminal 54 is shown in FIG. 2 to illustrate the difference in the rise time of the voltage $V_{DS}$. When a power switch, such as transistor M2, is coupled to the low-side driver 68, the voltage $V_{DS}$ at the output node of low-side driver 68 increases slowly due to the need to charge the input impedance of the power switch, as shown by curve 84. On the other hand, when no power switch is coupled to the low-side driver 68, the voltage $V_{DS}$ increases rapidly as the output node (terminal 54) of the driver is left open, as shown by curve 82. A reference voltage $V_{REF2}$ can be used to differentiate between the two voltage responses of voltage $V_{DS}$.

In operation, the one-shot pulse 86 is generated in response to a power cycle signal and is synchronized to the first PWM pulse of the PWM ramp clock signal 88. At comparator 74, the voltage $V_{DS}$ is compared with reference voltage $V_{REF2}$. At the falling edge of the one-shot pulse 86, latch 72 latches the output voltage of comparator 74. If the voltage $V_{DS}$ is less than the reference voltage $V_{REF2}$, indicating a power switch is coupled to the low-side driver, then the output signal of comparator 74 has a positive logical state. If the voltage $V_{DS}$ is greater than the reference voltage $V_{REF2}$, indicating the absence of a power switch, the output signal of comparator 74 has a negative logical state.

Latch 72 latches the output signal of comparator 74 at the falling edge of the one-shot pulse and provides the latched data value as an low-side enable (LS_EN) signal to control logic circuit 64. In this manner, control logic circuit 64 receives the low-side enable signal having a first logical state indicating the presence of a power switch at terminal 54 and a second logical state indicating the absence of a power switch at terminal 54. Control logic circuit 64 can disable the low-side driver 68 when no power switch is coupled to the low-side driver. Alternately, control logic circuit 64 will continue to provide control signals to the low-side driver 68 the low-side enable signal indicates that a power switch is coupled to the low-side driver.

The detection of a power switch at the low-side driver is activated at each power cycle or at each assertion of the Enable signal so that any changing configuration of PWM switching regulator 10 can be promptly determined.

The above detailed descriptions are provided to illustrate specific embodiments of the present invention and are not intended to be limiting. Numerous modifications and variations within the scope of the present invention are possible. The present invention is defined by the appended claims.

I claim:

1. A synchronous switching regulator controller comprising a first switch driver coupled to a first terminal to provide a first driving signal, a second switch driver coupled to a second terminal to provide a second driving signal, a PWM ramp clock generator providing a PWM ramp clock signal to a PWM comparator and a control logic circuit generating control signals for the first and second switch drivers based at least in part on the output signal of the PWM comparator, the synchronous switching regulator controller comprising:

a switch detection circuit receiving a power cycle signal indicating that the synchronous switching regulator controller is to be turned on and the PWM ramp clock signal, the switch detection circuit measuring a voltage at an output node of the second switch driver, the switch detection circuit providing a driver enable signal to the control logic circuit in response to the assertion of the power cycle signal, the driver enable signal having a first logical state when the voltage at the output node of the second switch driver is greater than a reference voltage and a second logical state when the voltage at the output node of the second switch driver is less than the reference voltage, wherein the control logic circuit disables the second switch driver when the drive enable signal has the first logical state and enables the second switch driver when the drive enable signal has the second logical state.

2. The synchronous switching regulator controller of claim 1, wherein the switch detection circuit comprises:

an one-shot circuit coupled to receive the power cycle signal and the PWM ramp clock signal, the one-shot circuit generating an one-shot pulse in response to the assertion of the power cycle signal, the one-shot pulse being synchronized to a first PWM pulse of the PWM ramp clock signal generated for the second switch driver;

a comparator having a first input terminal coupled to receive the voltage at the output node of the second switch driver, a second input terminal coupled to receive the reference voltage and an output terminal providing an output signal indicative of the difference between the voltage at the output node of the second switch driver and the reference voltage, the output signal of the comparator having a first logical state when the voltage at the output node is greater than the reference voltage and a second logical state when the voltage at the output node is less than the reference voltage; and a latch having an enable terminal coupled to receive the one-shot pulse, a data terminal coupled to receive the output signal of the comparator, and an output terminal providing the driver enable signal, the latch operative to latch the output signal of the comparator at the falling edge of the one-shot pulse, wherein the latch provides the driven enable signal having the same logical state as the output signal of the comparator at the falling edge of the one-shot pulse.

3. The synchronous switching regulator controller of claim 1, wherein the driver enable signal has the first state to indicate that no power switch is connected to the second switch driver and the driver enable signal has the second state to indicate that a power switch is connected to the second switch driver.

4. The synchronous switching regulator controller of claim 1, wherein the power cycle signal comprises an enable signal provided to the synchronous switching regulator controller.

5. The synchronous switching regulator controller of claim 1, wherein the synchronous switching regulator controller is configured for converting a DC input voltage to a DC output voltage, the power cycle signal comprising a signal indicative of the DC input voltage having a value exceeding a threshold level.

6. The synchronous switching regulator controller of claim 2, wherein the one-shot pulse has a pulse duration the same as or less than the pulse duration of the first PWM pulse of the PWM ramp clock signal.

7. The synchronous switching regulator controller of claim 2, wherein the voltage at the output node of the second switch driver is greater than the reference voltage when the impedance at the output node is an open circuit.

8. The synchronous switching regulator controller of claim 2, wherein the voltage at the output node of the second switch driver is less than the reference voltage when the impedance at the output node has a value associated with the input impedance of a power switch.

9. The synchronous switching regulator controller of claim 1, wherein the reference voltage is generated internally in the synchronous switching regulator controller.

10. The synchronous switching regulator controller of claim 1, wherein the reference voltage is an external voltage provided to the synchronous switching regulator controller.

* * * * *